(12) United States Patent  
Patawaran et al.

(10) Patent No.: US 8,964,976 B2
(45) Date of Patent: *Feb. 24, 2015

(54) SECURE STORAGE AND RETRIEVAL OF CONFIDENTIAL INFORMATION

(71) Applicant: Oceanblue Systems, LLC, Las Vegas, NV (US)

(72) Inventors: Rogel Patawaran, Marina del Rey, CA (US); Greg Chapman, Marina del Rey, CA (US)

(73) Assignee: Oceansblue Systems, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,070

(22) Filed: Jul. 15, 2013

(65) Prior Publication Data

US 2014/0181987 A1    Jun. 26, 2014

Related U.S. Application Data

(63) Continuation of application No. 13/080,951, filed on Apr. 6, 2011, now Pat. No. 8,488,785.

(60) Provisional application No. 61/322,042, filed on Apr. 8, 2010.

(51) Int. Cl.
*H04L 9/00*        (2006.01)
*H04L 9/32*        (2006.01)
(Continued)

(52) U.S. Cl.
CPC .............. *G06F 21/62* (2013.01); *G06F 21/78* (2013.01); *H04L 9/0894* (2013.01); *H04L 67/1097* (2013.01); *G06F 2221/2149* (2013.01); *H04L 63/0428* (2013.01)
USPC ............................... 380/46; 713/193; 726/27

(58) Field of Classification Search
USPC ................. 380/46; 713/193–194; 726/26–30; 705/50, 64, 70, 75–79
See application file for complete search history.

(56) References Cited

U.S. PATENT DOCUMENTS 5,936,541 A    8/1999   Stambler
6,088,454 A *   7/2000   Nagashima et al. .......... 380/286
(Continued)

FOREIGN PATENT DOCUMENTS

KR    10-2008-0109707 A1    12/2008
KR    10-2009-0052130 A1     5/2009
(Continued)

OTHER PUBLICATIONS

International Search Report and Written Opinion of the International Searching Authority (ISA/KR), dated Dec. 23, 2011, for PCT Application No. PCT/US2011/031564, filed Apr. 7, 2011, entitled "Secure Storage and Retrieval of Confidential Information" (published Oct. 13, 2011 as WO 2011/127271), which is the PCT Counterpart to U.S. Patent No. 8,488,785 B2.

*Primary Examiner* — Hosuk Song
(74) *Attorney, Agent, or Firm* — McDermott Will & Emery LLP

(57) ABSTRACT

A secure information storage management system may securely manage the storage of confidential information. A randomizer module may randomly generate a schema that specifies a random number of pieces, a random size for each piece, a random sequence for the pieces, and/or a random location where each piece is to be stored. The randomizer module may divide the confidential information into pieces that collectively constitute the confidential information in conformance with the schema. A storage management module may cause each piece of confidential information to be stored at a different, non-contiguous storage location. When present, the storage management module may cause each piece to be stored at the location for it that is specified in the schema.

4 Claims, 2 Drawing Sheets

(51) Int. Cl.
*G06F 21/62* (2013.01)
*G06F 21/78* (2013.01)
*H04L 9/08* (2006.01)
*H04L 29/08* (2006.01)
*H04L 29/06* (2006.01)

(56) References Cited

U.S. PATENT DOCUMENTS

| | | | |
|---|---|---|---|
| 6,742,712 B1 * | 6/2004 | Kawaguchi et al. | 235/492 |
| 7,103,915 B2 * | 9/2006 | Redlich et al. | 726/27 |
| 7,264,152 B2 | 9/2007 | Tsuei et al. | |
| 7,467,284 B2 * | 12/2008 | Dekker et al. | 711/206 |
| 8,132,073 B1 | 3/2012 | Bowers et al. | |
| 8,488,785 B2 * | 7/2013 | Patawaran et al. | 380/46 |
| 2004/0254894 A1 | 12/2004 | Tsuei et al. | |
| 2006/0265328 A1 | 11/2006 | Yasukura | |
| 2008/0104709 A1 | 5/2008 | Averyt et al. | |
| 2009/0100446 A1 | 4/2009 | Dekker et al. | |
| 2009/0164506 A1 | 6/2009 | Barley et al. | |
| 2010/0084849 A1 | 4/2010 | Masuda | |
| 2011/0107108 A1 | 5/2011 | Hirai | |

FOREIGN PATENT DOCUMENTS

| | | |
|---|---|---|
| WO | 2009079263 A1 | 6/2009 |
| WO | 2009079264 A1 | 6/2009 |
| WO | 2009079265 A1 | 6/2009 |

* cited by examiner

SECURE STORAGE AND RETRIEVAL OF CONFIDENTIAL INFORMATION

CROSS-REFERENCE TO RELATED APPLICATIONS

This application is a continuation application of U.S. patent application Ser. No. 13/080,951, filed Apr. 6, 2011 (issuing Jul. 16, 2013 as U.S. Pat. No. 8,488,785), entitled "Secure Storage and Retrieval of Confidential Information,"; which is based upon and claims priority to U.S. provisional patent application 61/322,042, entitled "Credit Card Information and Data Protection Storage System," filed Apr. 8, 2010. The entire content of each of these application and patent is incorporated herein by reference.

BACKGROUND

1. Technical Field

This disclosure relates to the secure storage and retrieval of confidential information, including credit and debit card information.

2. Description of Related Art

Electronic shopping, commonly referred to as e-commerce, has revolutionized how consumers purchase goods and services from merchants. Because of the Internet and, more recently, the personal data assistant ("FDA") and the wireless phone, merchants are able to showcase and sell products and services without the customer ever having to leave their home or enter a brick and mortar store.

Security concerns, however, are among the most important issues confronting today's electronic shopping models. Most of these transactions are completed using credit or debit cards. Unlike traditional telephone and in-store credit or debit card processing machines, today's wireless and Internet-related communication systems can be more susceptible to the unauthorized misappropriation and use of this sensitive financial information.

Attempts have been made to make the Internet and wireless transactions more secure. For example, credit and debit card information has been encrypted and/or protected by "tokenization." Tokenization uses an unrelated string of numbers and/or letters to represent and securely access stored credit or debit card information. The actual credit or debit card information, such as the card number, does not have to be exchanged between merchants and processors over the Internet.

Notwithstanding, a breach of systems at TJX Companies between July 2005 and mid-January 2007 exposed data from more than 45.6 million credit cards. In August 2009, information from more than 130 million credit and debit cards was stolen from Heartland Payment Systems, retailers 7-Eleven and Hannaford Brothers, and two other companies. There have been numerous other break-ins of so-called secure networks. Over the past five years, hundreds of millions of credit cards have been stolen, not during the transaction, but from the computers that had been storing them. Encryption and/or tokenization did not protect this information.

SUMMARY

A secure information storage management system may securely manage the storage of confidential information. A randomizer module may randomly generate a schema that specifies a random number of pieces, a random size for each piece, a random sequence for the pieces, and/or a random location where each piece is to be stored. The randomizer module may divide the confidential information into pieces that collectively constitute the confidential information in conformance with the schema. A storage management module may cause each piece of confidential information to be stored at a different, non-contiguous storage location. When present, the storage management module may cause each piece to be stored at the location for it that is specified in the schema.

The randomizer module may randomly generate the schema by randomly selecting one of a stored set of different schemas, each stored schema being indicative of a number of pieces, a size for each piece, a sequence for the pieces, and/or a random location where each piece is to be stored.

The secure information storage management may include a key generation module configured to generate a unique reconstruction key that is indicative of the schema and that is unique for each different instance of confidential information that is managed by the secure information storage management system.

The storage management module may cause each piece of the confidential information to be stored in a different one of a cluster of computers.

The confidential information may include credit or debit card information, including a credit or debit card number. The randomizer module may divide the credit or debit card number into pieces that collectively constitute the credit card or debit card number in conformance with the randomly-generated schema.

A secure information retrieval management system for securely managing the retrieval of the confidential information may include a retrieval management module configured to cause pieces of information that collectively constitute the confidential information to be retrieved from different, non-contiguous storage locations. An assembler module may assemble the retrieved pieces into the confidential information in conformance with a unique reconstruction key that is unique for each different instance of confidential information and that is indicate of the schema.

The retrieval management module may cause each piece of the confidential information to be retrieved from a different one of a cluster of computers.

The assembler module may assemble the retrieved pieces of confidential information into a credit card or debit card number in conformance with the schema.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
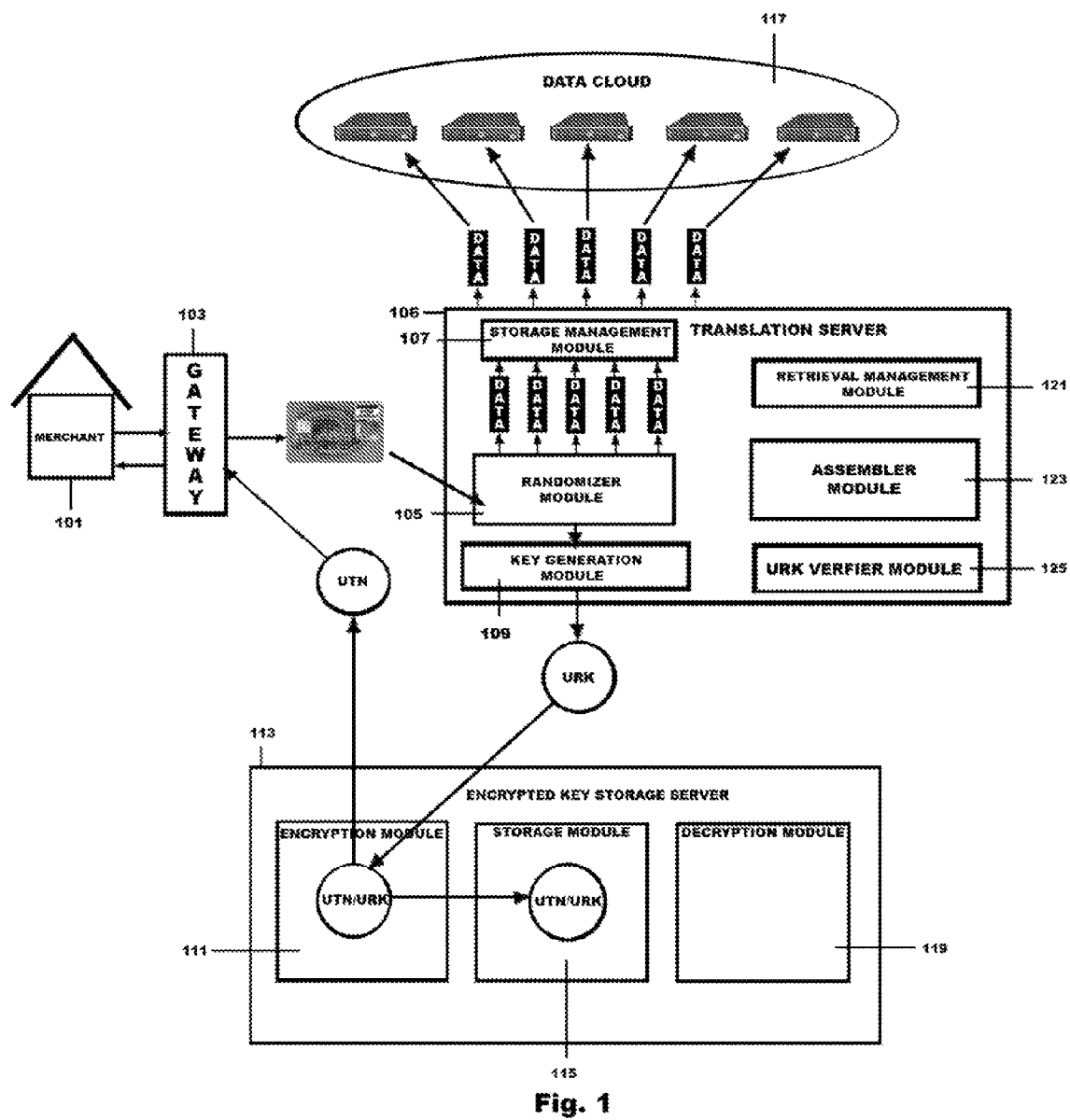
FIG. 1 illustrates an example of components that may be involved with the secure storage of credit or debit card information, and an example of an information flow process that these components may implement.

FIG. 1 illustrates an example of components that may be involved with the secure storage of credit or debit card information, and an example of an information flow process that these components may implement. As illustrated in FIG. 1, a merchant 101 may provide credit or debit card information to a gateway 103 for the purpose of consummating a purchase transaction. The information may include the credit or debit card number, the purchaser's name, the purchaser's billing address, the amount of a particular transaction, the credit or debit card expiration date, the credit or debit card security code, and/or the three digit CVV2 number on the back of the credit or debit card.

The merchant 101 may utilize any technology to deliver this card information to the gateway 103. For example, the merchant may utilize a computer connected to the Internet.

The gateway 103 may be a computer system that facilitates the purchase transaction. For example, the gateway 103 may seek to verify the validity of the credit or debit card information and whether the purchased transaction is otherwise authorized. The gateway 103 may consummate the transaction by charging or debiting the purchaser's account and/or crediting the merchant's account.

The gateway 103 may send all or portions of the credit or debit card information that the gateway 103 received from the merchant 101 and/or other information that the gateway 103 gathers or generates during its processing to a randomizer module 105 within a translation server 106.

The randomizer module 105 may be configured to divide the card information that it receives from the gateway 103 into pieces that collectively constitute the card information. The randomizer module 105 may be configured to divide the card information into these pieces in conformance with a schema that specifies the number of pieces, the size for each piece, a sequence for the pieces, and/or a location where each piece is to be stored.

The randomizer module 105 may be configured to randomly generate the schema so as to contain a random number of pieces, a random size for each piece, a random sequence for the pieces, and/or random locations where each piece is to be stored. In some configurations, only one of these criteria is randomly specified. In other configurations, two, three, or all four of these criteria are randomly specified. In one configuration, for example, the schema may specify a random number of pieces, a random size for each piece, and a random sequence for the pieces, but not a random location where each piece is to be stored.

The randomizer module 105 may utilize any technology for generating this random information. For example, a random number generator may be utilized to generate the random number of pieces, the random size for each piece, the random sequence for the pieces, and/or the random location where each piece is to be stored.

The randomizer module 105 may randomly generate the schema by instead randomly selecting one of a stored set of different schemas. Each stored schema may be indicative of a particular number of pieces, a particular size for each piece, a particular sequence for the pieces, and/or a particular location where each piece is to be stored. In this configuration, the randomizer module 105 may utilize any technology for randomly selecting one of the stored set of different schemas, such as a random number generator.

As part of this process, the credit or debit card number itself may be divided into several pieces, all being governed by the randomly-generated schema.

The randomizer module 105 may deliver each divided piece of information in whatever sequence may have been dictated by the schema to a storage management module 107. In the event that no sequence has been specified by the schema, the randomizer module 105 may deliver the pieces of information in a pre-determined sequence. In either case, each piece of information may be sent in a manner that conforms to the sequence, such as by sending each piece of information serially in accordance with the sequence.

A key generation module 109 may be configured to generate a unique reconstruction key (URK) that is indicative of the schema and that is unique for each different instance of confidential information that is delivered to the randomizer module 105 from the gateway 103. The key generation module 109 may deliver this URK to an encryption module 111 located within an encryption and key storage server 113.

The encryption module 111 may be configured to encrypt the URK by generating a unique transaction number (UTN) for the URK and by causing both the URK and the UKN to be stored as different fields within the same record in a storage module 115, also within the encryption and key storage server 113. The encryption module 111 may then deliver the UTN back to the gateway 103 which, in turn, may deliver the UTN back to the merchant 101, all as also illustrated in FIG. 1. The merchant 101 may save the UTN for later use, as described below in connection with FIG. 2.

Concurrently, or at a different time, the storage management module 107 may be configured to cause each piece of card information it receives from the randomizer module 105 to be stored at a different, non-contiguous storage location. For example, the storage management module 107 may be configured to cause each piece of the card information to be stored in a different one of a cluster of computers, such as a cluster of computers in a data cloud 117. In the event that the schema specifies the location where each piece is to be stored, the storage management module 107 may be configured to cause each piece to be stored at the location specified for it in the schema. When such locations are not specified in the schema, the storage management module 107 may instead be configured to store each piece at a pre-determined location, based on the sequence of the piece. For example, the first piece in a sequence may always be stored in a first server, the second piece in a sequence may always be stored in a second server, etc. The storage management module 107 may instead be configured to store all of the pieces of information on the same storage device, but in non-contiguous locations. Storage of the information in separate servers is considered a species of storing the information at non-contiguous locations.

Although FIG. 1 illustrates the URK as being encrypted before being sent to the gateway 103, an alternate configuration may deliver the URK to the gateway 103 unencrypted.

Various forms of additional security may be provided in connection with the various information that is communicated during the process illustrated in FIG. 1, such as the card information that is transmitted by the merchant 101 to the gateway 103 and/or from the gateway 103 to the randomizer module 105, the information that is transmitted from the randomizer module 105 to the key generation module 109, the pieces and any location information that is transmitted from the randomizer module to the storage management module 107, the pieces and any location information that is transmitted from the storage management module 107 to the data cloud 117, the URK that is transmitted from the key generation module 109 to the encryption module 111, the UTN that is transmitted from the encryption module 111 to the gateway 103 and/or to the storage module 115, and/or from the gateway 103 to the merchant 101. For example, the information which is transmitted may be encrypted using, for example, symmetric-key crypto systems, public-key cryptosystems, or hybrid cryptosystems. Similarly, the authenticity of the system which sends the information may also or instead be verified by the system which receives the information and/or vice versa using, for example, X.509. Other types of security may in addition or instead be used, such as secure socket layer with known certificate authorities, as well two-factor authentication schemas.

The merchant may again wish to utilize the credit or debit card information. For example, the merchant 101 may wish to access this information for the purpose of providing a refund, providing an adjustment, for financial audits, or court-ordered investigations involving fraud.

Figure 2:
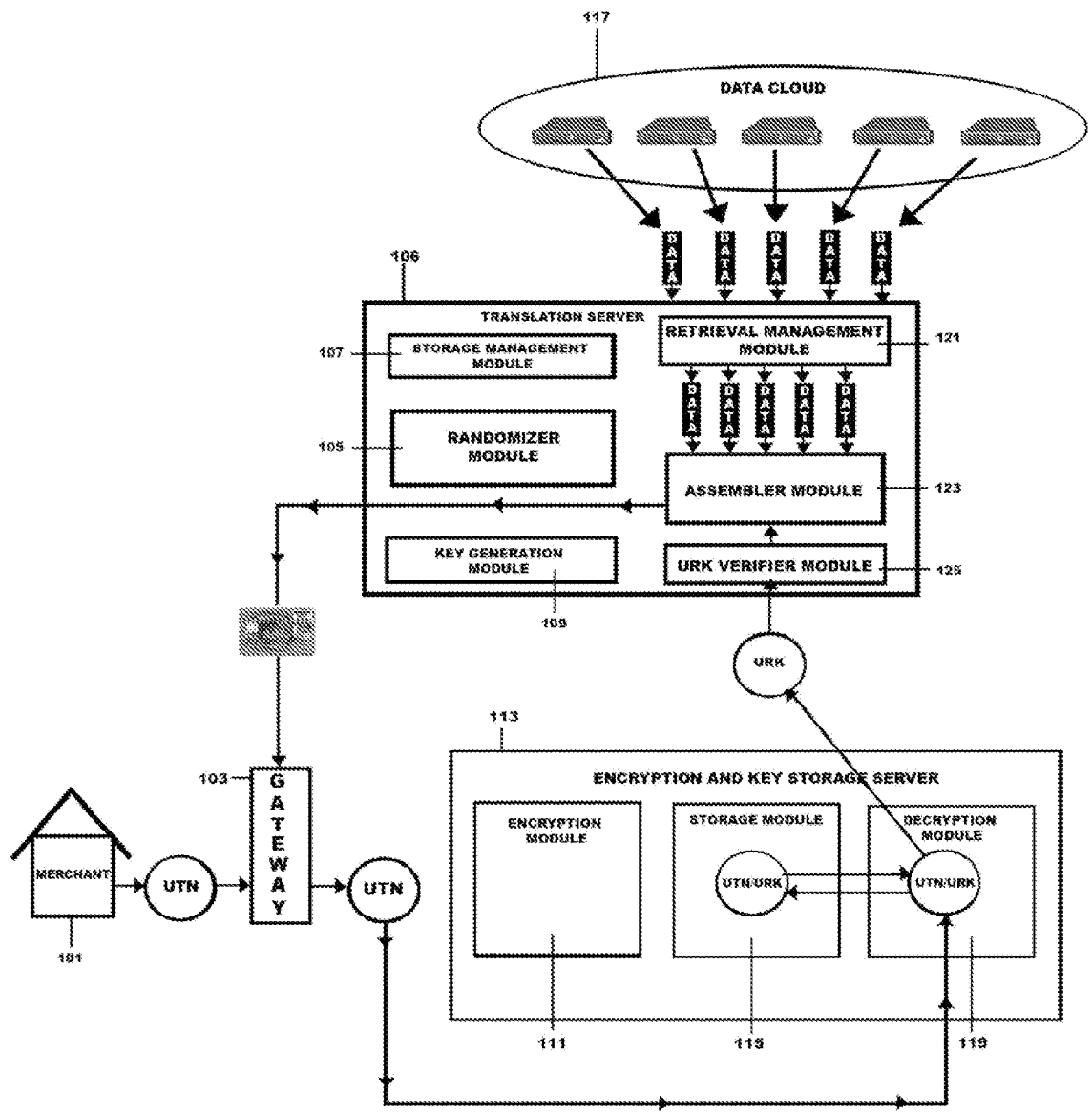
FIG. 2 illustrates an example of components that may be involved with the secure retrieval of credit or debit card infor-

FIG. 2 illustrates an example of components that may be involved with the secure retrieval of credit or debit card information, and an example of an information flow process that these components may implement. As illustrated in FIG. 2, the merchant 101 may send the UTN to the gateway 103. The merchant 101 may use any technology to do this, such as a computer system connected to the internet.

The gateway 103 may forward the UTN to a decryption module 119 in the encryption and key storage server 113. The decryption module 119 may be configured to decrypt the UTN to extract the URK from it. The decryption module 119 may be configured to do so using any technology. For example, the decryption module 119 may look in the storage module 115 for the record that includes the UTN and retrieve the corresponding URK in this record.

The decryption module 119 may deliver the decrypted URK to a URK verifier module 125 in the translation server 106. The URK verifier module 125 may be configured to verify that the URK is, in fact, one that was generated by the key generation module 109. The URK verifier module 125 may be configured to perform this verification using any technology. For example, the URK verifier module 125 may be configured to use X.509 and/or two-factor authentication schemas. The URK verifier module 125 may be configured to send the verified URK to an assembler module 123, also within the translation server 106.

As discussed above, the URK may not be encrypted in some configurations. In this situation, the gateway 103 may be configured to send the unencrypted URK directly to the URK verifier module 125.

In some configurations, the URK verifier module 125 may similarly be omitted. In this situation, the URK may not be verified.

The assembler module 123 may be configured to analyze the URK to determine which credit or debit card information is being requested and to determine the schema that was used to divide this card information into pieces, including, when applicable, the number of pieces, the size for each piece, the sequence for the pieces, and/or the location where each piece is stored. The assembler module 123 may be configured to direct a retrieval management module 121 to obtain each piece of information from the data cloud 117. For example, the assembler module 123 may tell the retrieval management module 121 about the number of pieces and the size of each piece.

In turn, the retrieval management module 121 may issue appropriate requests to the data cloud 117 for each of the pieces and retrieve each piece in response. If the location of each piece is not part of the schema, the retrieval management module 121 may be configured to receive the number of pieces from the assembler module 123 and to sequentially access this number of non-contiguous storage locations, making reference to its own internal, pre-determined set of storage locations. Conversely, if the location of each piece of information is part of the schema, the assembler module 123 may provide this location information to the retrieval management module 121 which, in turn, may query each location that is specified in this information from the assembler module 123 for each piece.

The locations from which the retrieval management module 121 seeks each piece of information may match the locations at which they were originally stored. For example, if all of the pieces were stored at non-contiguous storage locations within a single storage device, the retrieval management module 121 may request all of those pieces from these non-contiguous locations in the single storage device. Conversely, if each piece of information was stored in a separate computer within the data cloud 117, such as is illustrated in FIGS. 1 and 2, the retrieval management module 121 may seek to obtain each piece of information from its respective separate computer.

The pieces of information that the retrieval management module 121 receives in response may be passed by the retrieval management module 121 to the assembler module 123. The assembler module 123 may be configured to assembly the retrieved pieces into the original credit or debit card information in conformance with any sequence that may have been specified in the URK.

The assembler module 123 may be configured to return the assembled credit or debit card information back to the gateway 103.

In turn, the gateway 103 may utilize the information that it receives back from the assembler module 123 in connection with the subsequent transaction that was requested by the merchant 101. The gateway 103 may or may not be configured to deliver all of any portion of the card information that it receives back from the assembler module 123 to the merchant 101.

Various forms of additional security may be provided in connection with the various information that is communicated during the process illustrated in FIG. 2, such as the UTN that is transmitted by the merchant 101 to the gateway 103 and/or from the gateway 103 to the decryption module 119, the UTN that is sent by the decryption module 119 to the storage module 115, the URK that is sent by the storage module 115 to the decryption module 119, the URK that is transmitted from the decryption module 119 to the URK verifier module 125, the URK that is transmitted from the URK verifier module 125 to the assembler module 123, the schema and any location information that is transmitted by the assembler module 123 to the retrieval management module 121, the data requests and any location information that are transmitted from the retrieval management module 121 to the data cloud 117, the pieces that are transmitted from the data cloud 117 to the retrieval management module 121, the pieces that are transmitted from the retrieval management module 121 to the assembler module 123, and/or the card information that is transmitted from the assembler module 123 to the gateway 103 and/or from the gateway 103 to the merchant 101. For example, the information which is transmitted may be encrypted, authenticated, and/or otherwise secured using any of the technologies described above in connection with the transmission of information in FIG. 1.

The storage management module 107 and/or any other system may be configured to delete the pieces of the card information that are stored in the data cloud 117 and/or the UTN and/or URK that is stored in the storage module 115 based on one or more conditions. One condition, for example, may be the passage of a pre-determined amount of time after the information is stored. For example, a merchant may have a policy to provide a refund or other transaction adjustment only within a certain number of days after the transaction. In this situation, there may not be a need to store the pieces of the card information, the URK, and/or the UTN after expiration of this period. Instead, the storage management module 107 and/or another system may be configured to automatically delete this information after the passage of this period.

In other situations, the merchant 101 may enter into a new transaction with the same customer who may use the same credit or debit card. Instead of using the UTN from the previous transaction, however, the merchant 101 may instead deliver the same card information to the gateway 103, following which a storage process may take place, such as illustrated in FIG. 1 and discussed above. In this circumstance, the second transaction may generate a different URK and, accordingly, a different UTN. In this circumstance, the original URK and associated UTN may no longer be needed, as well as the originally stored pieces. As a consequence, the storage management module 107 and/or other system may be configured in this circumstance to delete the first set of pieces that were stored, along with their associated URK and UTN.

In still a further circumstance, the pieces of the card information and/or its associated UTN and URK may be deleted by the storage management module 107 and/or another system upon command.

Although having thus-far been discussed in the context of credit or debit card information, the components and processes that have been described may be used to securely store and retrieve any other type of confidential information, such as confidential patient information, other financial account information, software source codes, chemical formulas, and secret recipes.

Although FIGS. 1 and 2 illustrate the various modules that have been discussed as being housed in one of two servers—the translation server 106 or the encryption and key storage server 113, one or more of these modules may instead be contained within the other server or within a server or other computer system not illustrated in the figures.

Each server may be configured to send and/or receive communications over a network communication systems, such as the Internet. A virtual private network between the various servers, modules, the gateway 103, and/or the merchant 101 may be established for additional security.

The translation server 106, the encryption and key storage server 113, the gateway 103, and all other servers may be implemented with a computer system configured to perform the functions that have been described herein for the component. Each computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens). Each computer system includes one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The invention claimed is:

1. A secure information storage management system for securely managing the storage of confidential information comprising:
   a randomizer module that includes a processor, the randomizer module being configured to:
      generate a random schema that specifies a random number of pieces, a random size for each piece, and/or a random sequence for the pieces; and
      divide the confidential information into pieces that collectively constitute the confidential information in conformance with the schema; and
   a storage management module that includes a processor, the storage management module being configured to cause each piece of confidential information to be stored at a different, non-contiguous storage location,
   wherein the random schema specifies a random number of pieces.

2. A secure information storage management system for securely managing the storage of confidential information comprising:
   a randomizer module that includes a processor, the randomizer module being configured to:
      generate a random schema that specifies a random number of pieces, a random size for each piece, and/or a random sequence for the pieces; and
      divide the confidential information into pieces that collectively constitute the confidential information in conformance with the schema; and
   a storage management module that includes a processor, the storage management module being configured to cause each piece of confidential information to be stored at a different, non-contiguous storage location,
   wherein the random schema specifies a random size for each piece.

3. A secure information storage management system for securely managing the storage of confidential information comprising:
   a randomizer module that includes a processor, the randomizer module being configured to:
      generate a random schema that specifies a random number of pieces, a random size for each piece, and/or a random sequence for the pieces; and
      divide the confidential information into pieces that collectively constitute the confidential information in conformance with the schema; and
   a storage management module that includes a processor, the storage management module being configured to cause each piece of confidential information to be stored at a different, non-contiguous storage location,
   wherein the random schema specifies a random sequence for the pieces.

4. A secure information storage management system for securely managing the storage of confidential information comprising:
   a randomizer module that includes a processor, the randomizer module being configured to:
      generate a random schema that specifies a random way of dividing the confidential information into separate pieces; and
      divide the confidential information into separate pieces that collectively constitute the confidential information in conformance with the schema; and
   a storage management module that includes a processor, the storage management module being configured to cause each piece of confidential information to be stored at a different, non-contiguous storage location.

\* \* \* \* \*